United States Patent [19]

Coale

[11] 4,184,746
[45] Jan. 22, 1980

[54] TRANSMISSIVE DIFFRACTIVE PHASE-GRATING

[76] Inventor: Edgar B. Coale, c/o Max Levy & Co. Inc., Wayne Ave. & Berkley St., Philadelphia, Pa. 19144

[21] Appl. No.: 514,199

[22] Filed: Oct. 11, 1974

Related U.S. Application Data

[62] Division of Ser. No. 304,200, Nov. 6, 1972, Pat. No. 3,842,202.

[51] Int. Cl.$^2$ .............................................. G02B 5/18
[52] U.S. Cl. ................................................ 350/162 R
[58] Field of Search .......................... 350/162 R, 167; 178/7.85

[56] References Cited

U.S. PATENT DOCUMENTS

| | | | |
|---|---|---|---|
| 2,746,030 | 5/1956 | Schrecongost | 178/7.85 |
| 3,095,475 | 6/1963 | Brake | 178/7.85 |
| 3,843,239 | 10/1974 | Tsunoda et al. | 350/164 |

FOREIGN PATENT DOCUMENTS 874462  8/1961  United Kingdom ................ 350/162 R

*Primary Examiner*—Jon W. Henry

[57] ABSTRACT

A transmissive diffractive phase-grating which substantially nulls the zeroth order of the light-source or substantially nulls the undiffracted transmission of generally all frequencies of visible light and which diverts and distributes substantially all of the so nulled light into pairs of first-order diffractive or spectral images of the original visible light-source, with each such diffractive image containing close to one half of the energy of the so nulled zeroth-order of light. The phase-grating consists of a transparent parallel-sided plate of glass or glass-like plate such as "Plexiglass" or the like having an uninterrupted polished planar surface on one side thereof and having the other side thereof composed of two generally equal sets of polished parallel planar surface-portions of small areas alternative with each other in generally uniform array, with the spacing of one set from the opposite surface of the plate differing from the spacing of the other set from said opposite surface by approximately 6000 Angstrom units;—with the areas of such alternating surface-portions being generally equal. The grating may also have each of its opposite sides composed of such alternating high and low areas, with the low areas on each side being juxtaposed to the low areas of the other side;—and in such case the alternating areas on each side are approximately 3000 Angstrom units apart from each other, so that the difference in the thickness of the plate in the juxtaposed areas will be approximately 6000 Angstrom units.

By reducing the difference in wall-thickness of the plate in the two sets of areas thereof to approximately 5000 or 5100 Angstrom units, approximately one-third of the light impinging on the light-receiving side of the grating may be sent forth from the opposite side thereof as an undiffracted zeroth-order image, and with a pair of first-order diffracted spectral images flanking such zeroth-order image, and with the intensity of such three images approximately equal, thereby producing a triad of images with the central one being of the zeroth-order and the two flanking ones being of the first order.

The combination of such phase-grating and a television picture-tube, in which the phase-grating is operatively juxtaposed to the face of the picture-tube, with the lines or rows of high and low areas of the grating generally parallel to or otherwise operatively oriented to the scan-lines or matrix of the picture-tube, and at such distance from the picture-surface of the tube that the two diffractive images of the information areas on the picture-surface of the tube will be spaced from each other to the maximum extent possible without overlap

2 Claims, 5 Drawing Figures

TRANSMISSIVE DIFFRACTIVE PHASE-GRATING

This application is a division of copending application Ser. No. 304,200 filed Nov. 6, 1972 and allowed on May 8, 1974, now U.S. Pat. No. 3,842,202.

BRIEF SUMMARY OF THE INVENTION

The present invention relates to transmissive diffractive phase-gratings which will null substantially all the zeroth-order of light impinging upon the light-receiving side of the grating and will propogate or send forth from its other side pairs of diffractive spectral images of the first order, with each such first-order spectral image containing close to one-half of the energy of the so nulled zeroth-order of light.

The present invention further relates to the enhancement of television pictures by viewing such televised pictures through the aforementioned phase-grating, thereby multiplying (by means of the phase-grating) the particulated portions of the picture or other visual information presented on the face of the picture tube in discreet lines, dots or areas spaced from each other at a given frequency, so that the particulations of the picture or other visual information will become less resolvable or discernible by the viewer.

The current United States practice in televised broadcasting is for the television camera to scan the object or scene to be televised in 525 lines per frame or in 525 lines distributed over the face of the picture-tube.

The number of scan-lines-per-inch on the face of any picture-tube is equal to the dimension of such face at a right-angle to the scan-lines divided into 525. Thus, for example, a so-called 25-inch picture-tube, whose vertical dimension is 17.5 inches will display a picture or other information in 30 lines-per-inch; this being the result of dividing 17.5 into 525. Similarly, a so-called 12-inch tube having a vertical dimension of approximately 9 inches would have the picture displayed thereon in approximately 58 lines-per-inch, while a 17-inch tube, having a certical dimension of about 11 inches, would have 45 lines-per-inch.

As the lines-per-frame televised is a function of the cycles-per-second of the available alternating electrical current, the lines-per-frame may differ (from the U.S. standard of 525 lines-per-frame) in countries or areas where the available power supply is 50 cycles-per-second.

It is the common experience when viewing a televised picture that if the viewer is far enough away from the picture tube his eyes cannot resolve or discern the individual scan-lines or information-lines, and he sees a picture without perceiving the separate lines or dots thereof, and that as the viewer moves closer and closer to the picture-tube he finally comes to a distance therefrom at which he begins to perceive the scan-lines or information-lines or dots which make up the televised picture.

For the sake of a reference or nomenclature, the minimum distance of the eye from the picture-tube at which the eye cannot perceive the individual scan-lines (on individual dots) may be regarded as the minimum non-resolution distance.

Such minimum non-resolution distance may vary somewhat from person to person, but nevertheless for every person there is a minimum distance at which he cannot perceive the individual scan-lines or information-lines, and at a lesser distance he begins to perceive the scan-lines.

However, the further a person mover away from the picture-tube the less bright the picture may appear to him. Furthermore, depending on the focal distance, a person may have to move closer to the picture-tube in order to bring it into his focal range;—much the same as a person lacking good vision may have to bring a piece of printed matter closer to his eye or place it further away from his eye, depending on the focal distance and/or the corrective lenses of his eyeglasses.

Hence, it would be highly desirable if the scan-lines per inch were substantially greater than what is actually displayed on a picture-tube, so as to permit viewers with varying degrees of sight (whether corrected or modified by glasses or not) to come closer to the picture-tube if they have need to do so (or chose to do so) without perceiving the individual scan-lines notwithstanding the shortened viewing distance.

The perception or discernment by the viewer of the individual scan-lines or information-lines is a distraction from the picture or the image of the picture which the eye transmits to the mind, in much the same way that the coarseness of the half-tone dot structure of pictures printed on paper is a distraction from the over-all mental absorption of the picture re-produced in such half-tone printing.

Thus, the intrusion, upon the mind, of the individual scan-lines on the face of the picture-tube, like the intrusion upon the mind of the individual half-tone dots of a printed picture degrades the perceived image of the picture being viewed.

In half-tone printing this distraction is reduced or minimized by breaking of the picture into individual dots of greater frequency per inch, until the individual dots are of such great frequency per inch that they are not resolvable by the normal eye at normal viewing distances.

Such fine half-tone printing (with a large number of dots per inch) is practiced in printing on coated paper stock especially prepared for such printing. However, a greater number of dots per inch is not possible in printing on coarse absorbent paper such as newspaper stock. For this reason a portrait or other picture reproduced in a newspaper is not as good or pleasing a picture as that produced in a magazine on a good grade of coated paper.

To decrease the minimum distance from the picture-tube at which the eye cannot resolve the scan-lines, the scan-lines-per-frame would have to be increased correspondingly. However, this presents virtually insurmountable technical and commercial problems, and for this reason all television is telecast at the same fixed number of scan-lines-per-frame. In the United States this is approximately 525 scan-lines-per-frame.

One of the objects of the present invention is to render the scan-lines of a televised picture unresolvable at half the distance from the picture tube than is presently possible for any given viewer and for any given size picture-tube.

I accomplish this by means of a special diffractive phase-grating of my invention which optically multiplies the number of scan-lines-per-frame and the number of scan-lines-per-inch.

I have found that a transparent diffraction phase-grating of the lammelar type in which the grating made up of two generally equal sets of successive and alternating parallel narrow equal areas or of otherwise distributed uniformly-spaced equal areas, with the plate-thickness of one set of areas differing from the plate-thickness of the other set of areas by an amount which is of the general order of between 5800 Angstrom units and 6300 Angstrom units, the zeroth order of light is nulled or substantially nulled and substantially all the energy of the so nulled zeroth order of light is converted into two spaced-apart diffracted light outputs or images of the first order, each such first-order image containing close to one-half of the original energy of the nulled zeroth order.

For reasons inherent in the human eye, the eye will "forgive" imperfections in what it sees, and such "forgiveness" may vary from person to person. Thus, the eye may not perceive a small percentage of the zeroth order of light coming through the grating (which has not been fully nulled), and the percentage of such un-nulled zeroth order of light nor discerned by the eye may vary from person to person. For this reason the difference in plate-thickness between the two sets of areas may vary by an amount of the general order of 5800 to 6300 Angstrom units, with an optimum of possibly about 6100 Angstrom units.

Any line or dot forming a part of the object (such as a televised picture) viewed through my phase-grating will become two lines or two dots displaced from the original line or dot along an axis 90° to the grating-line, and such two lines or dots will be spaced from each other according to the distance of my grating from the original line or dot source. The optimum distance of my grating from the original line or dot source (such as the face of the television picture-tube or the phosphor lines or dots on the inner surface of the face-plate of the picture-tube) is that at which the successive first order double images of the original lines or dots will be equidistance spaced from each other, or at which each of a pair of double images is moved from the original image a distance equal to one quarter of the spacing between two adjacent original lines or dots.

In this manner, the effect is a doubling of the number of lines or dots impinging upon the eye, thereby reducing to one half the ability of the eye to resolve the individual lines or dots and reducing to one-half the threshold distance (of the eye from the picture-tube) at which the eye can resolve the individual lines or dots composing the picture.

BRIEF DESCRIPTION OF THE DRAWINGS

In the accompanying drawings like reference-numbers indicate like parts.

In FIG. 3, the diffraction grating of the present invention is shown (schematically) as being formed in situ, integrally with the face-plate of the picture tube. The widths 32 and depths 21 of the grating-grooves 22 are likewise far out of proportion to each other and to the thickness or the actual size of the face-plate;—such non-proportional representation being necessary in order to make the grating grooves illustratable in a drawing of a size which can be encompassed within available field-of-drawing.

DETAILED DESCRIPTION OF THE INVENTION

Figure 1:
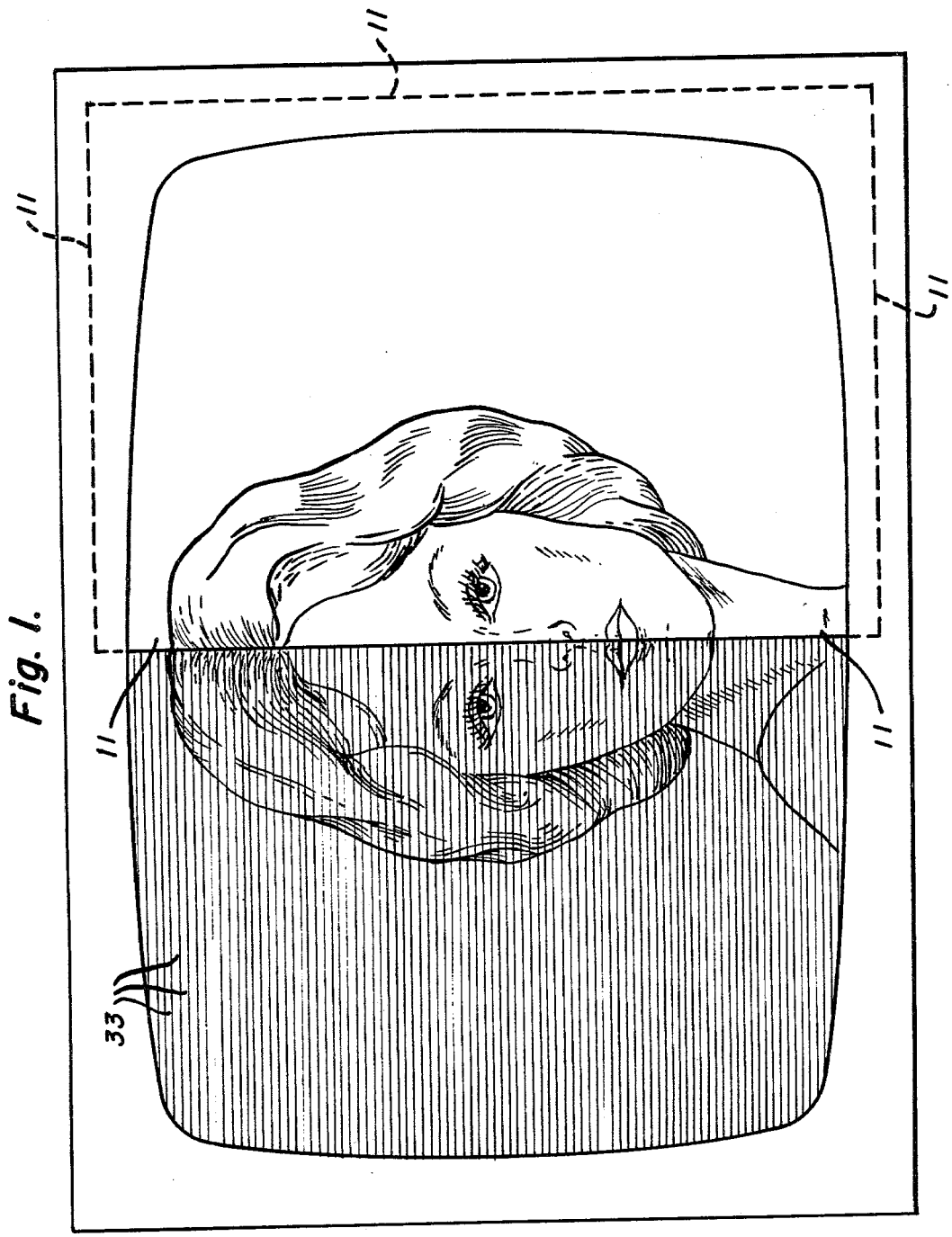
FIG. 1 represents a front elevational view of a face of a television picture tube, with a televised picture thereon, over the right-hand half of which the transmissive diffractive grating 11 is superimposed (indicating the obliteration of the scan-lines 33 when viewed from a point beyond the resolution distance);—the left-hand half of the televised picture showing the scan-lines as they would appear when viewed at the same distance.
Figure 2:
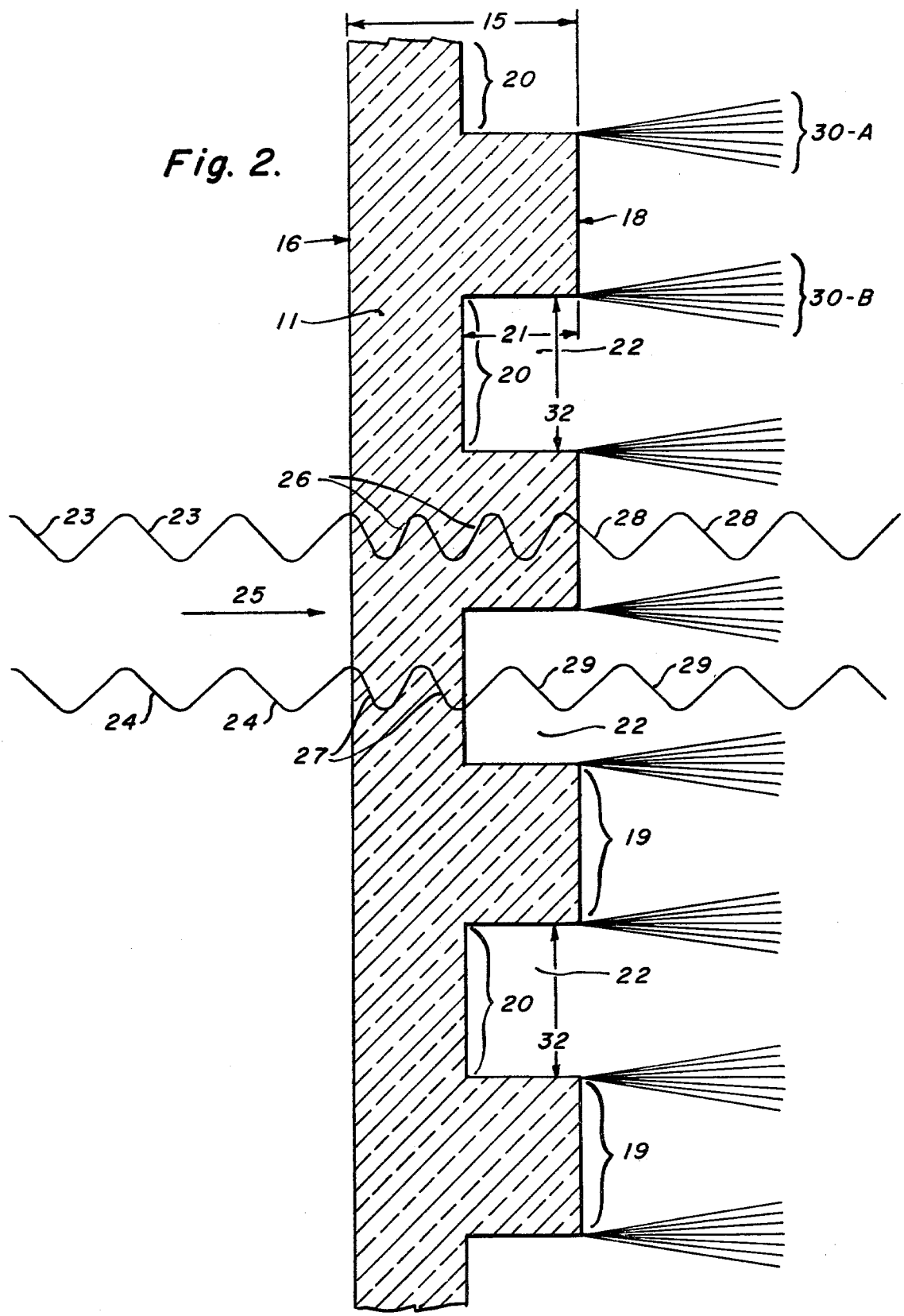
FIG. 2 represents a schematic cross-sectional view of the diffraction phase grating plate 11 of my invention, taken at a right-angle to a plate and also at a right angle to the pairs of high and low areas (19 & 20) of the plate. In order to permit the illustration, the plate-thickness 15 and the groove-depth 21 and groove-widths 32 are far out of proportion to each other, as will be appreciated from the more detailed description hereafter appearing in connection with the detailed description of the invention.

In FIG. 2, the diffractive grating plate is designated generally by the reference-number 11. FIG. 2 is intended to represent both the in situ diffractive grating formed integrally as a part of the outer surface 12 of the face-plate 13 of the picture-tube 14, and is also intended to represent the separate or non-integral diffraction grating plates illustrated in FIGS. 4 & 5, in which the diffraction grating plate 11 are formed of either a plate of glass or a plate of glass-like material such as "Plexiglass" or other suitable transparent plastic.

If the diffraction grating of the present invention is formed in situ or integrally with the outer surface 12 of the face-plate 13 of the picture-tube 14, then the wall-thickness of the face-plate 13 may be then regarded as the wall-thickness of the diffraction plate. The wall-thickness of the face-plate of the picture tube varies according to the size of the television tube, and may be as much as half an inch or so on larger television picture-tubes.

Figures 4, 5:
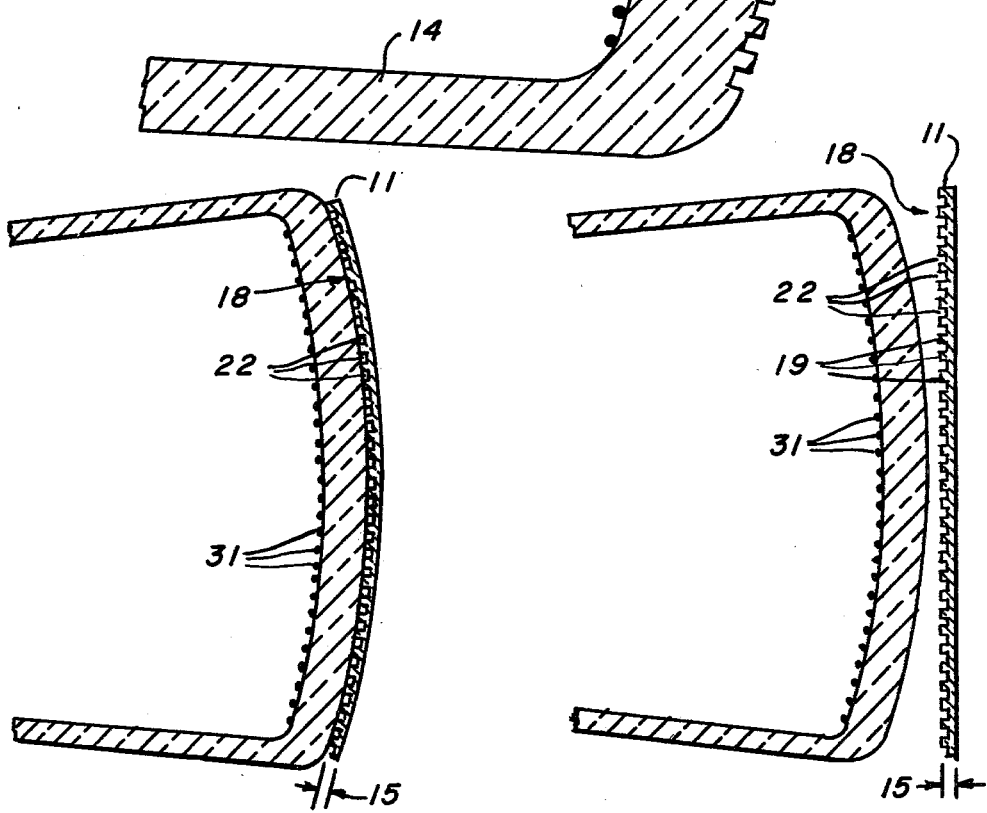
FIG. 4 represents a cross-sectional view of a face-plate of a picture-tube and a separate grating plate of the present invention operatively juxtaposed to the outer surface of the face-plate of the picture-tube.
FIG. 5 represents a cross-sectional view of a television picture-tube similar to that shown in FIG. 4 but in which the separate grating plate is curved to fit the curvature of the outer surface of the face-plate and in which the grooved or grating surface of the plate 11 is placed in contack with the outer surface of the face-plate of the picture tube.

If the diffraction grating-plate 11 is formed as a separate plate, as indicated in FIGS. 4 & 5 then such plate may be of considerably lesser thickness, as, for instance ⅛", 3/16", ¼" or thinner or thicker.

Figure 3:
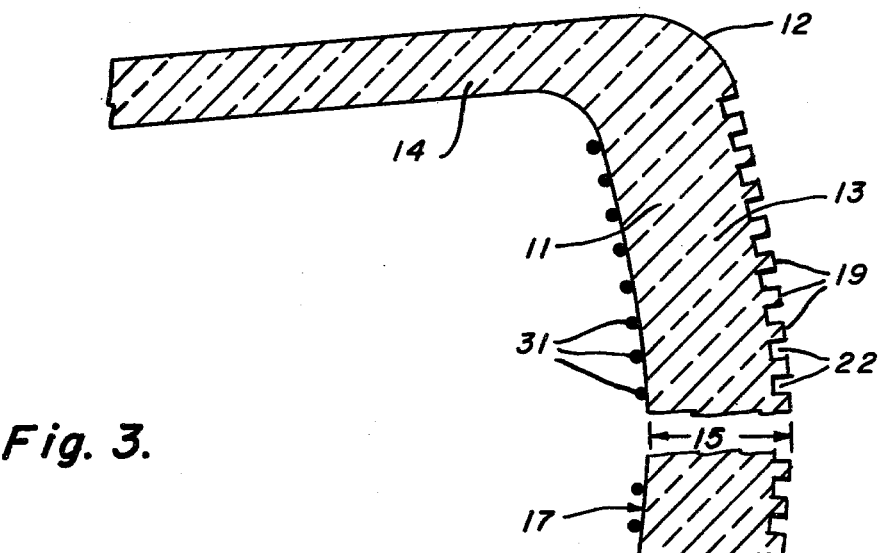
FIG. 3 represents the fragmentary cross-sectional view of a picture-tube. The phosphor layers, lines or dot-triads on the inner surface of the face-plate of the picture-tube are represented schematically by the elements 31 in FIGS. 3, 4 & 5.

In either of these cases, the wall-thickness is designated generally by reference-number 15 (FIG. 2). In FIG. 2 the light-receiving face or side of the plate is designated by reference 16, which in the in situ embodiment indicated in FIG. 3 would be the inner surface 17 of the face-plate 13 of the picture-tube. On the other hand, in the embodiments shown indicated in FIGS. 4 & 5, the light-receiving face or side of the grating-plate 11 may be the grooved face 18 thereof as shown in FIGS. 4 & 5 or it may be the ungrooved thereof. It is preferable to face the grooved side 18 of the separate grating-plate 11 towards the face-plate or the picture-tube as indicated in FIGS. 4 & 5.

For a 25" television picture-tube, I may form 810 to 860 grating-lines per inch on the grating-plate 11. What is herein designated as a "grating-line" comprises a groove 22 having the flat polished bottom surface 20 (constituting a "low" area of the grating-plate) and the high intervening polished area 19. Thus, a grating-line comprises a low-area 20 and an adjacent high area 19. In the illustration hereinabove mentioned such a 2-part "line" would have a width of the general order of one-eigth-hundred-thirtieth of an inch (or about 0.0012"), and the high surfaces 19 and the low surfaces 20 would each have a width of the general order of 0.0006".

The depth 21 of grooves 22 is of the general order of 5800 to 6100 Angstrom units when it is desired to null substantially all the visible zeroth-order light and to convert the so nulled zeroth-order light into pairs of first-order diffractive spectral images. If it is desirable to form triads of images, in which the central image will be the zeroth-order and the paid of flanking images will be forst-order diffractive spectral images, then the depth 21 of grooves 22 will be the order of 4900 to 5200 Angstrom units.

As the light waves 23 and 24 travel in the direction 25 towards the light-receiving face 16 of the grating, the waves 23 & 24 are in phase with each other.

As the waves travel in the material of the diffractive grating-plate, as at 26 & 27, their speed of travel is reduced, as represented schematically by the shortened length of the waves 28 & 29.

Due to the earlier emergence of the light-waves which emerge from the low areas 20 (in the grooves 22) the light waves 28 & 29 become out of phase with each other and interface with each other destructively to form pairs of diffractive spectral images 30-A and 30-B.

The diffractive grating of the present invention may be incorporated or formed in situ in the inner or outer surface of the face-plate of the picture-tube, preferably in the outer surface thereof, or it may be formed in a separate plate placed in front of the outer surface of the picture-tube at an appropriate distance, and such separate plate may be either planar or it may be curved to correspond to the curvature of the face-plate of the picture-tube so as to maintain a constant focal distance between the inner phosphor surface of the face-plate and the grating surface of the grating plate. The grating surface of such separate plate may be either on the surface thereof nearest the face-plate of the picture-tube or it may be on the opposite surface thereof. In either instance, the focal distance would be adjusted in relation to the phosphor surface of the face-plate and in relation to the lines-per-inch of the grating which bears a relationship to the scan-lines-per-inch produced in the reception of the televised picture or message.

The number of grating line-pairs per inch will vary according to the scan-lines-per-inch of the picture-tube and according to the distance of the grating surface from the phosphor surfacr or display surface of the picture-tube. A line-pair is comprised of one high surface 18 and an adjacent low surface 20. Optimally, it is preferable to place the grating surface immediately adjacent to the outer surface of the face-plate of the picture-tube or spaced outwardly therefrom only a slight distance (in the case of a separate grating plate), so as to minimize parallax when the televised picture is viewed from different angles. The 830 grating line-pairs-per inch selected for a 25-inch picture-tube is based in part upon the thickness of the face-plate of the picture-tube (which in current practice is approximately one-half inch for a 25-inch tube) and based upon the distance of the grating surface from the phosphor surface of the picture-tube, or what may be called the focal distance. In the embodiment in which the grating line-pairs are formed directly on the outer surface of the face-plate of the picture-tube, this focal distance would be the thickness of the face-plate. Where the grating is formed as a separate grating plate, the focal distance would be slightly greater depending on the mounting of the separate grating plate in relation to the face-plate of the picture-tube. However, optimally, such separate grating plate would still be placed as close to the outer surface of the face-plate of the picture-tube as practicable and also preferably with the grating surface of such plate juxtaposed or nearer to the face-plate of the picture-tube than its other surface. In case of smaller picture tubes, as, for instance, a 19-inch picture-tube or a 12-inch picture-tube, the grating line-pairs per inch may be fewer than in connection with the larger picture-tube because of the greater number of scan-lines per inch produced on such smaller picture-tube. In either case, however, the focal distance should be such that the two first-order spectral images produced in place of the nulled zeroth-order image will be spaced outwardly from the position of the invisible or nulled zeroth order by one-quarter of the distance between successive scan-lines of the original image.

In black-and-white television pictures the scan-lines are the result of the electron gun scanning the inner phosphor surface on the face-plate of the picture-tube in successive lines spaced from each other a slight distance; the space between such successive spaced-apart information lines are being illuminated and hence appearing as parallel dark lines cutting across the picture. Such line-by-line particulation of the picture may be regarded as the picture-particulating matrix. In color television the phosphor on the inner surface of the face-plate of the picture-tube is either formed as successive spaced-apart rows of triads of blue, green and red phosphor dots or by alternating blue, green and red phosphor lines spaced from each other slightly. In the case of the three-gun picture-tube each gun has its electron beam modulated to reflect the intensity of one of the three colors and scans the phosphor-carrying surface of the tube through beam positioners or separators, sometimes called the shadow-mask, through which each gun scans the rows of color triads but impinging on only one of the colored dots of each triad. In the case of a single gun color television tube the alternating (spaced apart) blue, green and red vertical phosphor lines are scanned horizontally by the electron beam of the gun through beam positioners which permit the beam to impinge upon only the colored phosphor line whose color-modulation beam then carries.

Hence, in color television the information-particulating matrix comprises not only successive spaced-apart scan-lines but also the triads of blue-green and red phosphor dots in each scan-line or the similar color particulation of the single-gun television tube.

Besides the previously mentioned horizontal scan-lines structure associated with most television pictures there are other visible repetitive matrix structures commonly associated with color television picture-tube construction. These structures normally take the form of either repetitive triads of blue, green and red phosphor dots, or, alternatively, repetitive structures of blue, green and red phosphor lines which may be either vertical or horizontal in distribution as well as certain matrix lines which may be visible and which are associated with the electronic deflection of the electron beam used to energize the phosphor. While normally these physical structures are of a higher frequency than the horizontal scan-line structure we have discussed, they may, in larger picture-tubes and with certain types of tube construction, become the operative visual structure rather than the horizontal scan-lines. The optical multiplying effect of the diffractive transmission phase-grating can be utilized to reduce (by image-multiplication) the visual perception of these matrix structures. Thus, the lines-per-inch of a diffractive phase-grating utilized to null these higher frequency matrix structures will be of a different frequency than those utilized to null the coarser horizontal scan-line matrix of the information-display. By incorporating a different frequency of grating lines per inch at some different angle but on the same operative diffractive plane, two different kinds and frequencies of matrix may be rendered non-resolvable. If, for example, the 525 lines per inch is to be nulled by 830 lines per inch at the face of the diffractive panel, then a finer frequency of the phosphor lines or dots themselves can be partially rendered non-resolvable by applying 600 grating lines per inch (for example) at 20° angular offset to the original 830 lines per inch on the same face of the grating panel. If the different matrix (which is to be rendered non-resolvable) is at 90° to the 525 lines then the second offset frequency would be arrayed at 90°. However, some optical multiplication will occur at any angle of offset to the orientation of the original matrix to be rendered non-resolvable.

While in the foregoing description and in FIGS. 1, 3, 4 & 5 of the drawings I have illustrated the use of my transmissive diffractive grating in connection with television picture-tubes, my grating may be used in conjunction or in combination with other particulated information displaying means, as, for instance, devices whose operative information display utilize glow-discharge effects or light emitting diodes or liquid-crystal devices and the like.

My foregoing theory of the nulling of the zeroth-order of light or the original image and its conversion into pairs of first-order diffractive spectral images, and the illustration of my theory by FIG. 2 of the drawings, is based on classical physical optical theory, including the classical wave-form theories and theories about the behavior of light. However, the real reason why and the manner in which the original zeroth-order image is nulled by my transmissive diffractive grating and converted into (or replaced by) pairs of spaced-apart first-order diffractive spectral images may possibly rest in some aspect or extension of more recent photon theory of light or may rest in some yet unborn theory of light or optics, and my foregoing theory may be erroneous in view of more recent or present or future investigations, without however, negating the observable effects or results produced by my grating or diminishing the utility thereof.

I am informed that there have been prior attempts, both electronic and optical, to accomplish that which is accomplished by my present invention, and that such prior attempts have been unsuccessful or impractical. I am informed that one of such prior attempts has been electronically to interleave additional scan-lines. I am also informed that one of the optical attempts has been to use a lenticular screen, in which the screen has successive rows of small depressions of curvilinear cross-sections, and that this attempt was unsuccessful because of the loss of picture-resolution in the vertical component; such lenticular screens generally producing a fuzzy or unclear picture.

In my diffractive grating the slight side-walls 34 are generally planar surfaces at a right angle to offset parallel surfaces 18 and groove-buttons 20.

Diffraction type of phase-gratings have been known heretofore, but such gratings have been capable of nulling generally only one light-frequency.

I have found that a diffractive phase-grating in which the alternating lines or rows of high and low areas are approximately 6100 Angstrom units apart (normal to the plane of the grating plate) nulls substantially all the otherwise transmitted visible light, and in its place produces from the edges between such high and low areas, two diffractive images of the original light source each containing approximately or close to one-half of the energy present in the original light source.

The frequency or the width and spacing of the alternating high and low areas or "lines" may be as low as on the order of 100 to 250 lines per inch, and is preferably on the order of 300 to 500 lines per inch. I use the word "line" in connection with my grating as being composed of two adjacent band or surface, one of which is spaced from the opposite face of the plate by 6100 Angstrom units more than the spacing of the other band from such opposite surface of the plate. The one which is spaced at the greater distance is herein referred to as the "high" surface and the one at the lesser spacing is herein referred to as the "low" surface. These high and low surfaces may be in the form of straight lines or in any other configuration or array alternating with each other, and such alternating high and low areas are generally equal to each other.

The "frequency" of such pairs of high and low areas used is selected according to the frequency of the scan-lines per inch on the face of the picture-tube and also by the appropriate distance between the picture-tube (or the phosphor portions thereof) and my phase-grating. Thus, for instance, when my phase-grating is used close to the outer surface of the picture-tube, a frequency of 400 or 500 pairs of high and low areas is desirable, whereas if the phase-grating is spaced an inch or inch-and-a-quarter or an inch-and-a-half from the face of the picture-tube, a frequency of perhaps 300 pairs of high and low areas per inch may be selected. Having selected the phase-grating of the specific frequency, as for instance 300 lines-pairs per inch or 400 line-pairs per inch or so, and then the distance between the phase-grating and the face of the picture-tube is adjusted till the two diffractive spectral images produced by the phase-grating (as, for instance, the two diffractive images of a single line or dot of the picture) are spaced from each other a maximum distance without overlap. At this distance, the two diffractive spectral images cannot be separated by the eye, namely, cannot be resolved by the naked eye and they appear as one continuous single image, and in this manner they present to the eye of the viewer a televised picture in which effective scan-lines per inch are twice the frequency appearing on the picture-tube itself. Thus, for instance, if on a 19 inch (diagonal) television-tube there are 40 or so scan-lines then when such picture is viewed through my phase-grating at the appropriate distance from the picture-tube, the picture is presented through twice that many scan-lines per inch, namely, of the order of 80 lines or so. Likewise, the correspondingly doubled number of lines are presented through my phase-grating no matter what the number of scan-lines of the pictures tube presents per inch.

I claim the following:

1. A transmissive diffractive phase-grating comprising a parallel-sided transparent polished plate having an index of refraction of the order of the indexes of refraction of plate glass, Plexiglass and commonly-used clear transparent optical glasses and optical plastics, at least one side of which plate is composed of two sets of alternating polished surface-portions, the surface-portions of each set being generally uniformly spaced apart and co-planar with each other and being of generally equal areas, and the surface-portions of one set alternating with the surface-portions of the other set in generally uniform array, and the co-planar surface-portions of one set being offset with respect to the co-planar surface-portions of the other set, with the common plane of the one set being parallel with the common plane of the other set, and the thickness of the plate in the areas of one set and the thickness of the plate in the areas of the other set differing by about 6100 Angstrom units, whereby substantially all transmission of generally all frequencies of visible light incident thereon is nulled and such pencil thereof is diverted and distributed into a pair of diffractive first-order spectral images each containing approximately one-half of the energy which had been the energy of the so nulled incident light.

2. A transmissive diffractive phase-grating comprising a parallel-sided transparent polished plate having an index of refraction of the order of the indexes of refraction of plate glass, Plexiglass and commonly-used clear transparent optical glasses and optical plastics, at least one side of which plate is composed of two sets of alternating polished surface-portions, the surface-portions of each set being generally uniformly spaced apart and co-planar with each other and being of generally equal areas, and the surface-portions of one set alternating with surface-portions of the other set in generally uniform array, and the co-planar surface-portions of one set being offset with respect to the co-planar surface-portions of the other set, with the common plane of the one set being parallel with the common plane of the other set, and the thickness of the plate in the areas of one set and the thickness of the plate in the areas of the other set differing by about 5100 Angstrom units, whereby about two-thirds of generally all frequencies of visible light incident thereon is nulled and each pencil thereof is diverted and distributed into a pair of diffractive first-order spectral images of the incident light, with one-third of the incident light remaining as an undiffracted zeroth-order image on the emitting face of the grating, and said pair of first-order spectral images flanking such undiffracted zeroth-order transmitted image on the emitting face of the grating, and with the intensity of each of such two first-order diffractive spectral images being generally equal to the intensity of such zeroth-order transmitted image.

* * * * *